(12) United States Patent
Hecht

(10) Patent No.: US 9,616,502 B2
(45) Date of Patent: Apr. 11, 2017

(54) CUTTING TOOL HOLDER WITH VIBRATION DAMPING WEIGHT ASSEMBLY

(71) Applicant: Iscar, Ltd., Tefen (IL)

(72) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 12 days.

(21) Appl. No.: 14/751,618

(22) Filed: Jun. 26, 2015

(65) Prior Publication Data

US 2016/0045960 A1    Feb. 18, 2016

Related U.S. Application Data

(60) Provisional application No. 62/036,264, filed on Aug. 12, 2014.

(51) Int. Cl.
*B23B 27/16* (2006.01)
*B23B 27/00* (2006.01)
(Continued)

(52) U.S. Cl.
CPC ............ *B23B 27/002* (2013.01); *B23B 27/08* (2013.01); *B23B 29/043* (2013.01); *B23B 29/12* (2013.01); *F16F 7/108* (2013.01); *B23B 27/083* (2013.01); *B23B 27/16* (2013.01); *B23B 2250/16* (2013.01); *B23C 5/003* (2013.01)

(58) Field of Classification Search
CPC ... B23B 27/002; B23B 27/086; B23B 27/083; B23B 2250/16; B23B 29/043
See application file for complete search history.

(56) References Cited

U.S. PATENT DOCUMENTS 3,242,791 A    3/1966    Smith
3,774,730 A *  11/1973  Maddux ................ B23B 29/022
                                                          188/379
(Continued)

FOREIGN PATENT DOCUMENTS

CA    2396366 A1 *  7/2001  ........... B23B 29/022
GB    2 317 670        4/1998
(Continued)

OTHER PUBLICATIONS

Search report dated Nov. 2, 2015 issued in PCT counterpart application (No. PCT/IL2015/050752).

*Primary Examiner* — Sunil K Singh
*Assistant Examiner* — Ryan Rufo
(74) *Attorney, Agent, or Firm* — Womble Carlyle

(57) ABSTRACT

A cutting tool holder has a holder body and a vibration damping weight assembly. The holder body has first and second side surfaces, and a top surface extending there between, and a cutting portion located at a front end of the holder body at the top surface thereof. A weight aperture opens out to the first and second side surfaces and has an aperture inner surface. A weight assembly is located within the weight aperture, having a first weight portion with a through hole, a second weight portion with a threaded hole, a damping ring located along the aperture inner surface, and a fastening member configured to connect together and urge the first and second weight portions towards one another, such that the contact surface of each weight portion presses against the damping ring, within the weight aperture.

15 Claims, 4 Drawing Sheets

(51) Int. Cl.
  B23B 29/12   (2006.01)
  B23B 29/04   (2006.01)
  F16F 7/108   (2006.01)
  B23C 5/00      (2006.01)
  B23B 27/08     (2006.01)

(56) References Cited

U.S. PATENT DOCUMENTS

| | | | | |
|---|---|---|---|---|
| 5,044,838 A | * | 9/1991 | Brookfield | B23B 27/083 |
| | | | | 407/103 |
| 5,540,615 A | * | 7/1996 | Murtuza | H02N 2/163 |
| | | | | 451/342 |
| 6,113,319 A | | 9/2000 | Hansson et al. | |
| 2003/0147707 A1 | * | 8/2003 | Perkowski | B23B 29/022 |
| | | | | 407/30 |
| 2005/0279598 A1 | | 12/2005 | McPherson | |
| 2006/0291973 A1 | * | 12/2006 | Claesson | B23B 27/002 |
| | | | | 409/234 |
| 2008/0031699 A1 | * | 2/2008 | Chen | B23B 31/006 |
| | | | | 409/232 |
| 2012/0003055 A1 | * | 1/2012 | Sasaki | B23B 27/002 |
| | | | | 408/143 |
| 2012/0099940 A1 | * | 4/2012 | de Souza Filho | B23B 31/02 |
| | | | | 409/131 |
| 2013/0206525 A1 | * | 8/2013 | Ogata | B23B 27/002 |
| | | | | 188/381 |
| 2014/0374168 A1 | * | 12/2014 | Michael | E21B 17/07 |
| | | | | 175/320 |
| 2015/0056025 A1 | * | 2/2015 | Guo | B23C 5/003 |
| | | | | 407/33 |
| 2015/0375305 A1 | * | 12/2015 | Frota de Souza Filho | B23B 29/022 |
| | | | | 408/143 |
| 2016/0045994 A1 | * | 2/2016 | Jayr | G01L 5/0061 |
| | | | | 407/66 |

FOREIGN PATENT DOCUMENTS

| | | | | |
|---|---|---|---|---|
| JP | 2003 062703 | | 3/2003 | |
| JP | 2003-062703 A | | 3/2003 | |
| JP | 2003-062704 A | * | 3/2003 | ............ B23B 27/00 |
| JP | 2004-202648 A | * | 7/2004 | ............ B23B 27/00 |
| JP | 2008 100332 | | 5/2008 | |
| JP | 2011 042007 | | 3/2011 | |
| JP | 2011-042007 A | | 3/2011 | |
| KR | 2012-0069195 | | 6/2012 | |

\* cited by examiner

CUTTING TOOL HOLDER WITH VIBRATION DAMPING WEIGHT ASSEMBLY

RELATED APPLICATIONS

The present invention claims priority U.S. Provisional Application No. 62/036,264, filed Aug. 12, 2014, whose contents are incorporated by reference in their entirety.

FIELD OF THE INVENTION

The present invention relates to cutting tool holders, in general, and to cutting tool holder blades with vibration damping mechanisms, in particular.

BACKGROUND OF THE INVENTION

Cutting tool holders, especially of the blade holder type, have a cutting insert located at a front end thereof. Performing cutting operations at the front end of the holder blade may cause unwanted vibrations at the cutting end. Cutting tool holders with vibration damping mechanisms are shown, for example, in JP2003062703A, JP2011042007A, U.S. Pat. No. 6,113,319 and KR101258519.

SUMMARY OF THE INVENTION

In accordance with the subject matter of the present application, there is provided a cutting tool holder, comprising:
  a holder body having a longitudinal axis, and comprising:
    first and second side surfaces, and a top surface extending there between;
    a cutting portion located at a front end of the holder body at the top surface;
    a weight aperture opening out to the first and second side surfaces and comprising an aperture axis extending transversely to the longitudinal axis, and an aperture inner surface;
and
  a weight assembly located within the weight aperture, and comprising:
    a first weight portion;
    a second weight portion;
    a damping ring located along the aperture inner surface; and
    a fastening member connecting together and urging the first and second weight portions towards one another, such that each weight portion presses against the damping ring within the weight aperture.

BRIEF DESCRIPTION OF THE DRAWINGS

For a better understanding of the present invention and to show how the same may be carried out in practice, reference will now be made to the accompanying drawings, in which.

Figure 1:
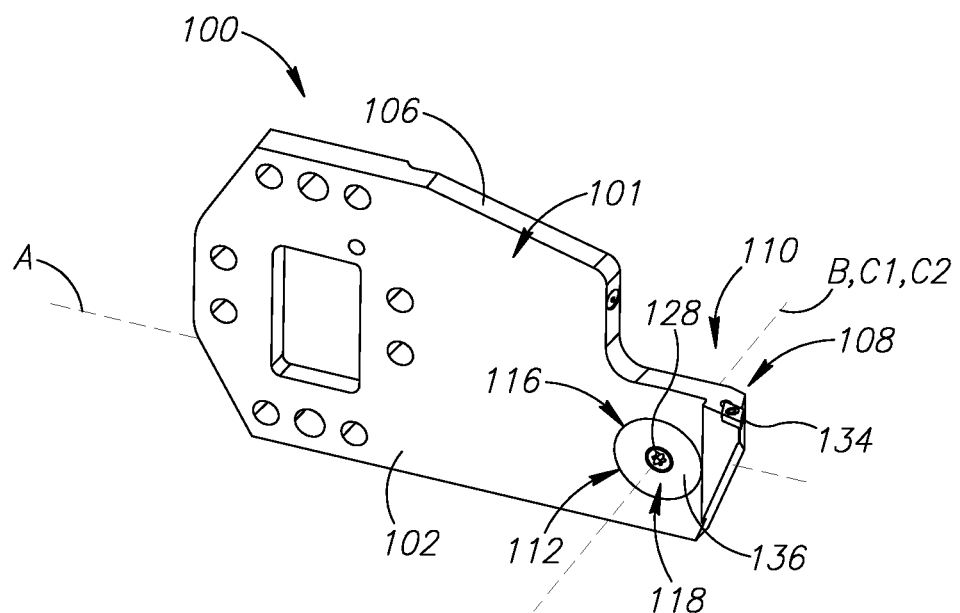
FIG. 1 is a perspective top view of a cutting tool holder according to an embodiment of the present invention.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Figure 2:
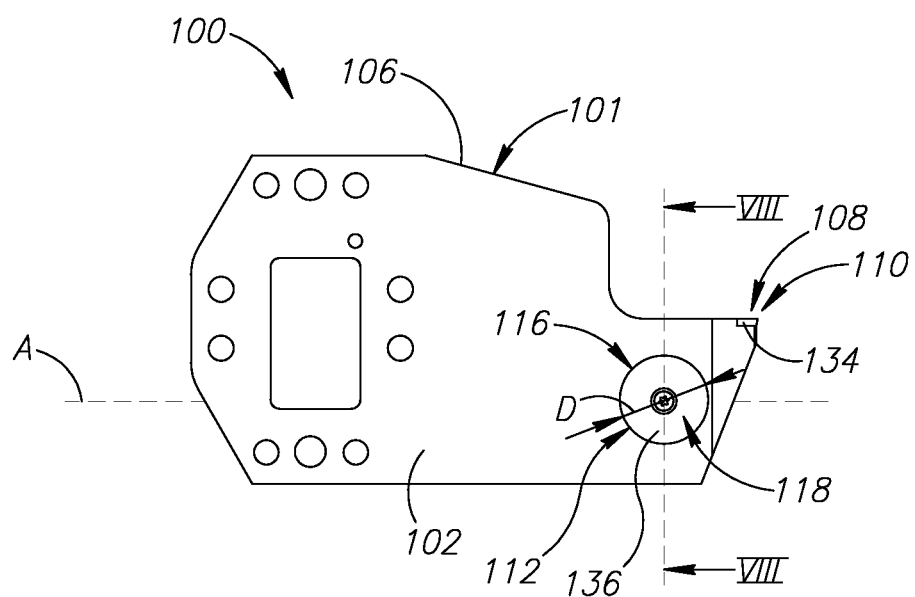
FIG. 2 is a side view of the cutting tool holder of FIG. 1.
Figure 3:
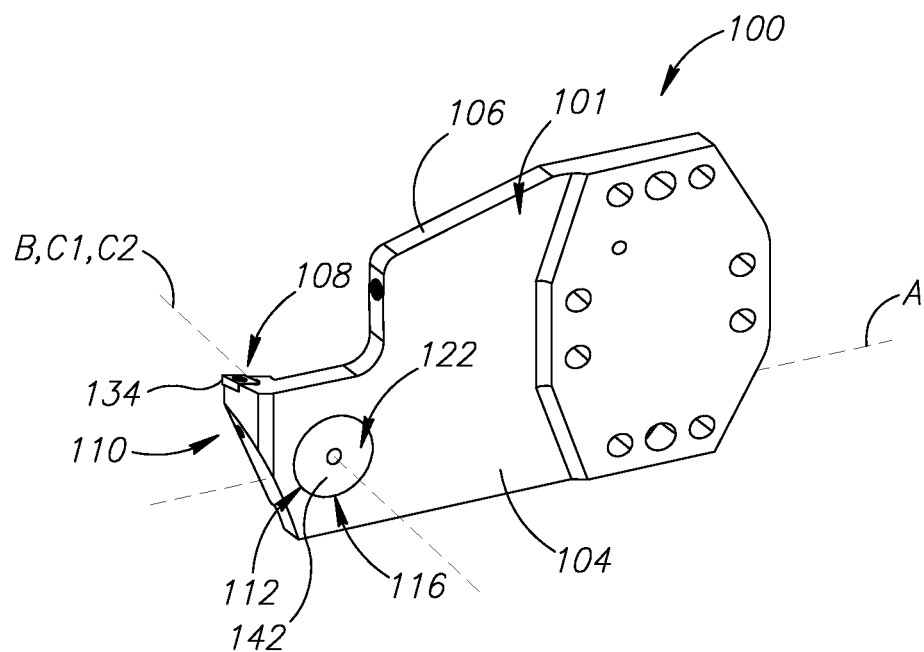
FIG. 3 is another perspective top view of the cutting tool holder of FIG. 1.
Figure 4:
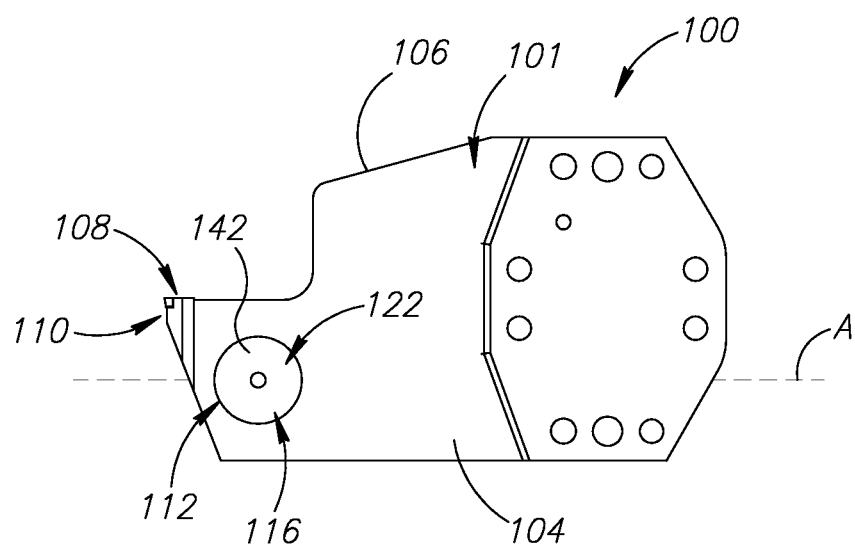
FIG. 4 is a side view of the cutting tool holder of FIG. 3.
Figure 5:
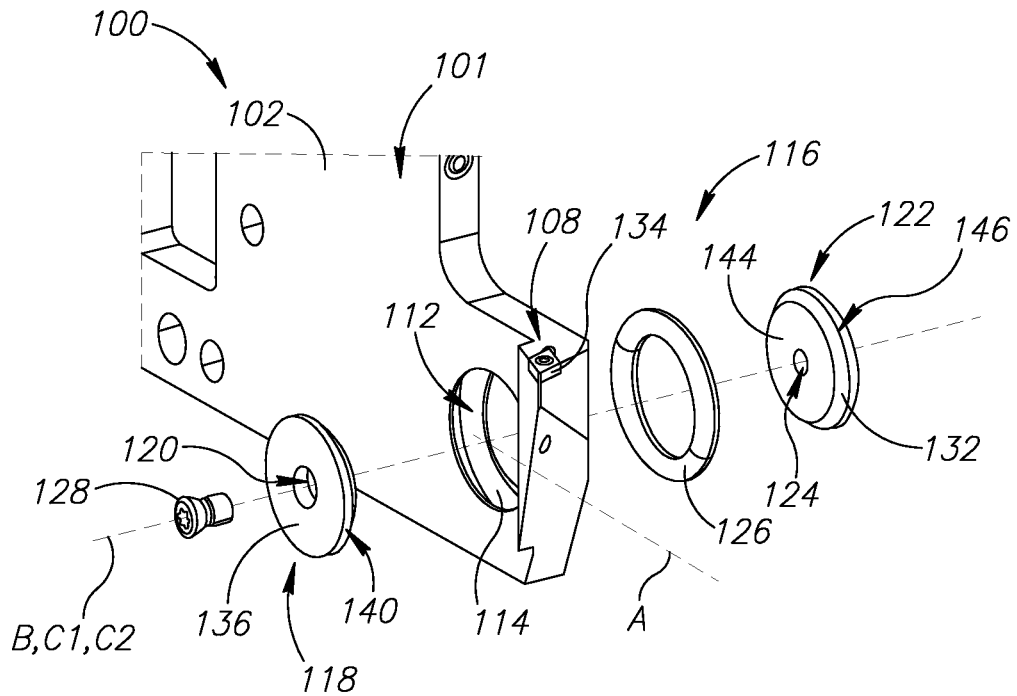
FIG. 5 is a perspective view of the cutting tool holder of FIG. 1, partially disassembled.
Figure 6:
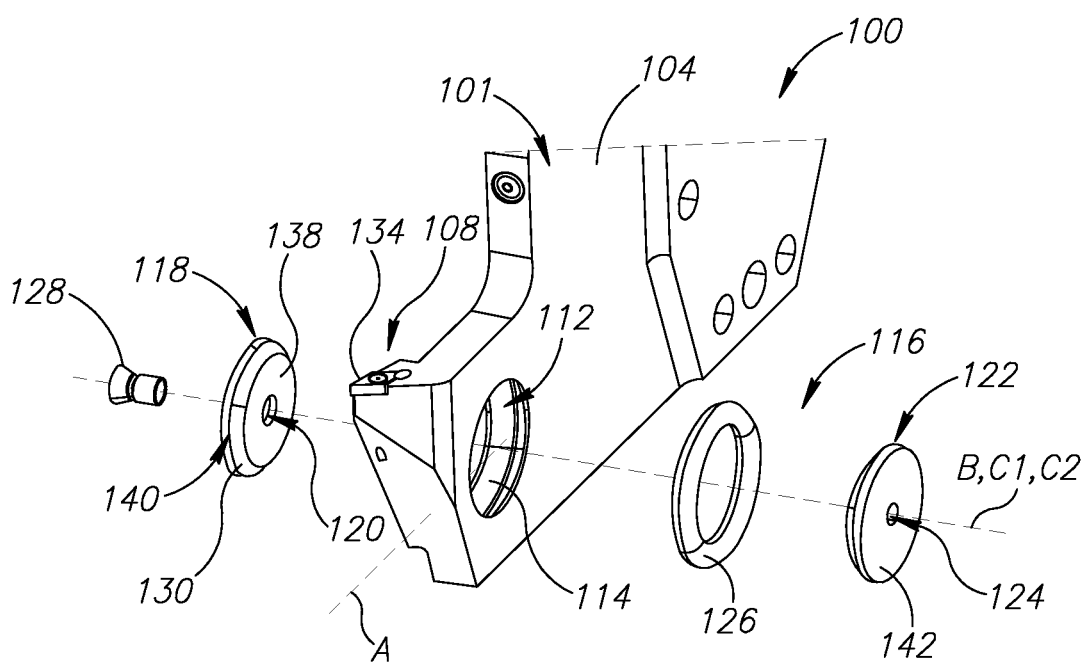
FIG. 6 is another perspective view of the cutting tool holder of FIG. 1, partially disassembled.
Figure 7:
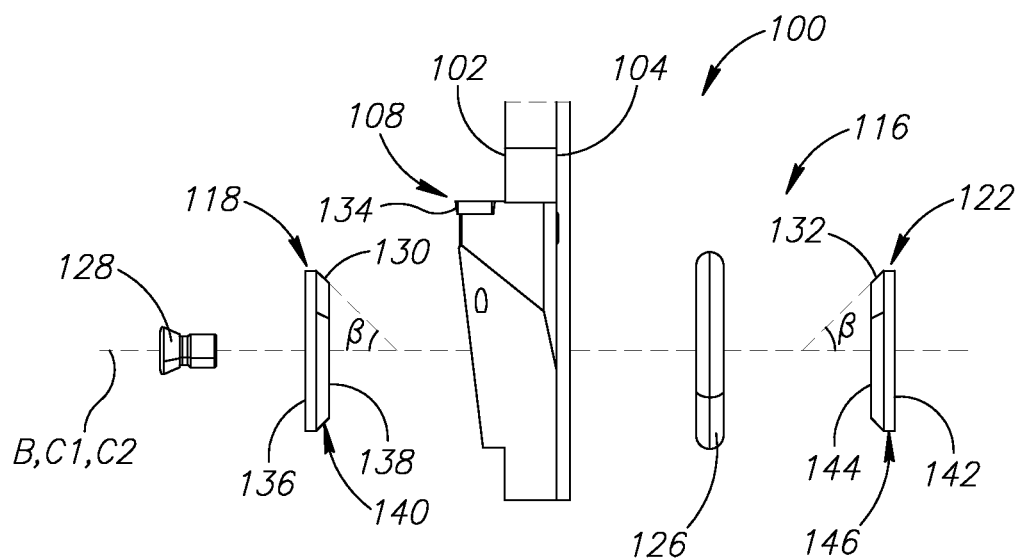
FIG. 7 is a front view of the cutting tool holder of FIG. 1, partially disassembled.
Figure 8:
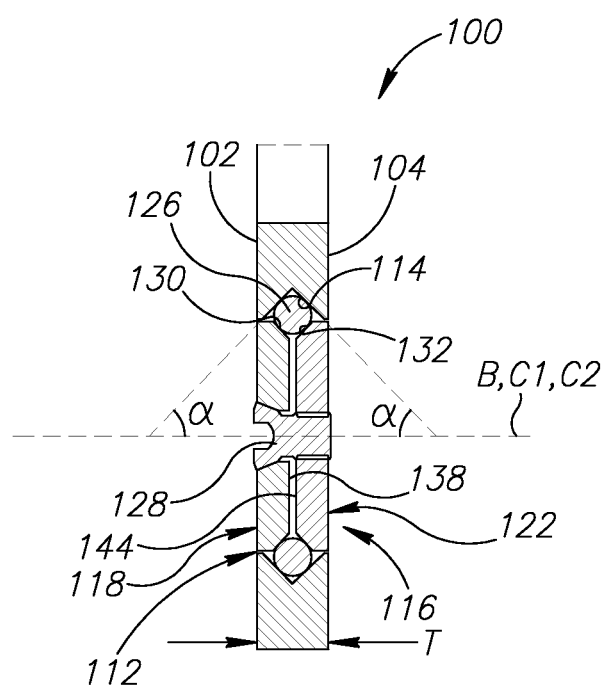
FIG. 8 is a cross sectional view of the cutting tool holder along the cutting line VIII-VIII indicated in FIG. 2.

Reference is now made to FIGS. 1-8, depicting various views of a cutting tool holder 100, according to an embodiment of the present invention. The cutting tool holder 100 comprises a holder body 101 with a generally elongated shape and a longitudinal axis A, and a weight assembly 116. The holder body 101 has a first side surface 102 and a second side surface 104, and a top surface 106 extending there between.

A cutting portion 108 is located at a front end 110 of the holder body 101 at its top surface 106. A weight aperture 112 is formed in the holder body 101, having an aperture axis B extending transversely to the longitudinal axis A. The weight aperture 112 opens out to both of the first and second side surfaces 102, 104. The weight aperture 112 has an aperture inner surface 114. In some embodiments, the weight aperture 112 is a round aperture, and as depicted in the cross section of FIG. 8, the aperture inner surface 114 is a symmetrical V-shaped surface, with each side of the V-shape forming a non-zero acute first angle $\alpha$ with the aperture axis B. In some embodiments, the first angle $\alpha$ is a 45° angle. In some embodiments, the weight aperture 112 may be located adjacent to the front end 110 of the holder body 101.

The weight assembly 116 is located within the weight aperture 112. The weight assembly 116 is a two-portion weight assembly, comprising a first weight portion 118 and a second weight portion 122. The weight assembly 116 also has a damping ring 126 and a fastening member 128, connecting together and urging the first and second weight portions 118, 122 towards one another. In the shown embodiment, the fastening member is in the form of a tightening screw 128, though bolts, pins, rivets and other connectors may also suffice. The first weight portion 118 has a through hole 120 passing there through, and located along the aperture axis B. The second weight portion 122 has a threaded hole 124 passing there through, and located along the aperture axis B. The threaded hole 124 of the second weight portion 122 may be a through hole or a blind hole. The damping ring 126 is located along the aperture inner surface 114, between the first and second weight portions 118, 122.

The damping ring 126 is made of elastic compressible material, such as rubber, and is elastically forced against the aperture inner surface 114. If the weight aperture 112 is round in shape, the damping ring 126 is an O-ring. The first and second weight portions 118, 122 are formed of a material denser than the material of the holder body 101. For example, if the holder body 101 is formed of steel, the first and second weight portions 118, 122 may be formed of, for example, hard metal, tungsten, and the like.

The first weight portion 118 has a first outer surface 136, a first inner surface 138, and a first peripheral surface 140 extending there between. The first peripheral surface 140 has a first contact surface 130. The second weight portion 122 has a second outer surface 142, a second inner surface 144, and a second peripheral surface 146 extending there between. The second peripheral surface 146 has a second contact surface 132. It is noted that the first and second weight portions 118, 122 are not necessarily identical, and may differ in weight or thickness.

The tightening screw 128 passes through the through hole 120 of the first weight portion 118 and threadingly engages the threaded hole 124 of the second weight portion 122. Thus, the tightening screw 128 tightens (i.e., pulls) the first and second weight portions 118, 122 towards one another. The tightening screw 128 is threaded into the threaded hole 124. When the tightening screw 128 is in a threaded position (e.g., FIGS. 1, 3 and 8), each of the first and second weight portions 118, 122 presses against the damping ring 126 within the weight aperture 112.

When the first and second weight portions 118, 122 are tightened together, the damping ring 126 is elastically compressed against the aperture inner wall 114. The first and second weight portions 118, 122 press against the damping ring 126 only with the first and second contact surfaces 130, 132. In some embodiments, each of the first and second weight portions 118, 122 has a disc shape with an associated central axis C1, C2, respectively, and each of the first and second contact surfaces 130, 132 obliquely extends towards the respective first and second inner surfaces 138, 144, while forming a non-zero acute second angle β with the respective central axis C1, C2 and/or the aperture axis B in the assembled tool holder (see FIG. 7). In some embodiments, the second angle β is a 45° angle. When each of the first and second weight portions 118, 122 has a disc shape, the through hole 120 and the threaded hole 124 are formed at the center of the disc shapes (as shown in the attached Figures).

When the weight assembly 116 is in the tightened position, the first and second weight portions 118, 122 are floating within the weight aperture 112. That is, the first and second inner surfaces 138, 144 do not contact one another, and the first and second weight portions 118, 122 only contact the damping ring 126 located there between. Furthermore, the first and second peripheral surfaces 140, 146 do not contact the aperture inner surface 114, as shown, for example, in FIG. 8.

In this manner, the damping ring 126 is restrained between the aperture inner surface 114, and the first and second contact surfaces 130, 132. Thus, the entire weight assembly 116 is restrained within the weight aperture 112, prevented from falling out there from.

A cutting insert 134 is retained in the cutting portion 108 of the holder body 101, for performing cutting operations on a work piece, e.g., turning, grooving or parting. During such cutting operations, the holder body 101 may be prone to chatter and vibrate (e.g., along the aperture axis B) due to its elongated shape and the repeated contact with the work piece. Such chatters or vibrations may be unwanted, as they move the cutting insert 134 in an uncontrolled manner during operation, thus forming a twisted or uneven groove on the work piece, which may damage the cutting operation or the surface quality of the work piece.

In order to reduce or eliminate such unwanted vibrations, the weight assembly 116 acts as a Dynamic Vibration Absorber (DVA) or a Tuned Mass Damper (TMD) for the holder body 101, by increasing the weight of a tool holder cutting portion 108, wherein the damping ring 126 acts as a spring and the tightened weight portions 118, 122 act together as the damping mass. The weight assembly 116 may thus be referred to as a vibration damping weight assembly 116. Vibrations of the holder body 101 are transferred through the damping ring 126 to the weight portions 118, 122, which, in turn, counteract to damp the vibrations of the holder body 101.

As the weight assembly 116 is a floating two-portion weight assembly, it has the advantage of fine tuning of the weight required for the particular cutting tool holder 100. The amount to which the tightening screw 128 is threaded into the threaded hole 124 affects the amount to which the damping ring 126 is elastically compressed against the aperture inner wall 114. This also affects the size of the contact surfaces between the first and second weight portions 118, 122 and the damping ring 126, and between the damping ring 126 and the aperture inner surface 114. In the DVA aspect of the weight assembly 116, this fine tuning determines the spring constant of the damping ring 126.

The weight of the weight assembly 116, and in particular the weight of each of the weight portions 118, 122, as well as the shape and dimension of the first and second weight portions 118, 122, are determined according to the shape and dimensions of the holder body 101, and according to the cutting operations to be performed with the cutting tool holder 100. The characteristics of the weight assembly 116 may change in different cutting tool holders. Alternatively, the cutting tool holder 100 may be used with different weight assemblies 116.

In addition, since the weight portions 118, 122 are tightened together in a floating manner relative to the holder body 101, the weight portions 118, 122 may be easily removed from the weight aperture 112, and replaced by other weight portions, as required. This flexibility is an advantage over other vibration damping weights which are fixedly coupled to the holder body, for example, by soldering or brazing, with no option of disassembly or replacement of the weights.

In some embodiments, a thickness T of the holder body 101, at the weight aperture 112, is smaller than an outer diameter D of the weight portions 118, 122 (see FIGS. 2 and 8) by a factor of at least 2 (i.e., D>2T). In some embodiments, the combined thickness of the tightened weight portions 118, 122 (i.e., the distance between the outer surfaces of the weight portions 118, 122 along the aperture axis B, e.g., FIG. 8), is similar to the thickness T of the holder body 101, so that the weight assembly 116 does not extend beyond the side surfaces 102, 104 of the holder body 101.

After the weight assembly 116 is placed within the weight aperture 112, the weight assembly 116 is tightened by the tightening screw 128, until the first and second weight portions 118, 122 are held together and sufficiently compress the damping ring 126. Then, the weight assembly 116 may be fixed in the tightened position, for example, by gluing the tightening screw 128 in the threaded position. In this manner, the tightening screw 128 is fixed in the threaded position, and prevented from threading out of the threaded hole 124, e.g., due to chatter or vibrations of the holder body 101. Additionally, the first and second weight portions 118, 122 and the damping ring 126 are fixed together, thereby preventing changes of the vibration damping effect of the weight assembly 116 (e.g., by a user of the cutting tool holder 100).

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. A cutting tool holder (100), comprising:
   a holder body (101) having a longitudinal axis (A), and comprising:
     first and second side surfaces (102, 104), and a top surface (106) extending there between;
     a cutting portion (108) located at a front end (110) of the holder body (101) at the top surface (106);
     a weight aperture (112) opening out to the first and second side surfaces (102, 104) and comprising an aperture axis (B) extending transversely to the longitudinal axis (A), and an aperture inner surface (114); and
   a weight assembly (116) located within the weight aperture (112), and comprising:
     a first weight portion (118);
     a second weight portion (122);
     a damping ring (126) located along the aperture inner surface (114); and
     a fastening member (128) connecting together and urging the first and second weight portions (118, 122) towards one another, such that each weight portion (118, 122) presses against the damping ring (126) within the weight aperture (112);
   wherein:
     the first and second weight portions (118, 122) float within the weight aperture (112), contacting the damping ring (126) located there between but not contacting one another and also not contacting the aperture inner surface (114); and
     the damping ring (126) has an O-ring shape.

2. The cutting tool holder (100) according to claim 1, wherein the weight aperture (112) is a round aperture.

3. The cutting tool holder (100) according to claim 1, wherein the aperture inner surface (114) is a symmetrical V-shaped surface, with each side of the V-shape forming a first angle (α) with the aperture axis (B).

4. The cutting tool holder (100) according to claim 3, wherein the first angle (α) is a 45° angle.

5. The cutting tool holder (100) according to claim 1, wherein the weight aperture (112) is located adjacent to the front end (110) of the holder body (101).

6. The cutting tool holder (100) according to claim 1, wherein the damping ring (126) is formed of a compressible material.

7. The cutting tool holder (100) according to claim 6, wherein the compressible material is rubber.

8. The cutting tool holder (100) according to claim 1, wherein the first and second weight portions (118, 122) are formed of a material denser than the material of the holder body (101).

9. The cutting tool holder (100) according to claim 8, wherein the holder body (101) is formed of steel, and the first and second weight portions (118, 122) are formed of hard metal.

10. The cutting tool holder (100) according to claim 1, wherein:
    each of the first and second weight portions (118, 122) has a disc shape,
    the first weight portion (118) has a first outer surface (136), a first inner surface (138), and a first peripheral surface (140) extending there between, the first peripheral surface (140) having a first contact surface (130),
    the second weight portion (122) has a second outer surface (142), a second inner surface (144), and a second peripheral surface (146) extending there between, the second peripheral surface (146) having a second contact surface (132), and
    each of the first and second contact surfaces (130, 132) obliquely extends towards the respective first and second inner surfaces (138, 144), while forming a second angle (β) with the aperture axis (B).

11. The cutting tool holder (100) according to claim 10, wherein the second angle (β) is a 45° angle.

12. The cutting tool holder (100) according to claim 1, wherein:
    each of the first and second weight portions (118, 122) has a round shape with an outer diameter (D), and
    a thickness (T) of the holder body (101), at the weight aperture (112), is smaller than the outer diameter (D) by a factor of at least two.

13. The cutting tool holder (100) according to claim 1, wherein:
    the first weight portion (118) has a through hole (120);
    the second weight portion (122) has a threaded hole (124);
    the fastening member comprises a tightening screw (128) passing through the through hole (120) of the first weight portion (118) and threadingly engaging the threaded hole (124) of the second weight portion (122), thereby tightening the first and second weight portions (118, 122) towards one another,
    wherein in a threaded position of the tightening screw (128), each weight portion (118, 122) presses against the damping ring (126) within the weight aperture (112).

14. The cutting tool holder (100) according to claim 13, wherein each of the first and second weight portions (118, 122) has a disc shape, the through hole (120) and the threaded hole (124) are formed at the center of the disc shapes.

15. The cutting tool holder (100) according to claim 1, wherein:
    the first weight portion (118) is disc-shaped;
    the second weight portion (122) is disc-shaped;
    the first weight portion (118), the second weight portion (124) and the damping ring (126) are arranged along the aperture axis (B); and
    the damping ring (126) has a larger diameter than both the first and second weight portions (118, 122).

* * * * *